United States Patent
Wang et al.

(10) Patent No.: US 11,964,401 B2
(45) Date of Patent: Apr. 23, 2024

(54) ROBOT GLOBALLY OPTIMAL VISUAL POSITIONING METHOD AND DEVICE BASED ON POINT-LINE FEATURES

(71) Applicant: ZHEJIANG UNIVERSITY, Hangzhou (CN)

(72) Inventors: Yue Wang, Hangzhou (CN); Yanmei Jiao, Hangzhou (CN); Rong Xiong, Hangzhou (CN)

(73) Assignee: ZHEJIANG UNIVERSITY, Hangzhou (CN)

( * ) Notice: Subject to any disclaimer, the term of this patent is extended or adjusted under 35 U.S.C. 154(b) by 197 days.

(21) Appl. No.: 17/489,738

(22) Filed: Sep. 29, 2021

(65) Prior Publication Data
US 2022/0111531 A1    Apr. 14, 2022

Related U.S. Application Data

(63) Continuation of application No. PCT/CN2020/119891, filed on Oct. 9, 2020.

(51) Int. Cl.
*B25J 9/16* (2006.01)
*G05D 1/00* (2006.01)

(52) U.S. Cl.
CPC ........... *B25J 9/1697* (2013.01); *B25J 9/1664* (2013.01); *G05D 1/0246* (2013.01); *G05D 1/0274* (2013.01)

(58) Field of Classification Search
CPC ....... B25J 9/1697; B25J 9/1664; G05D 1/027; G05D 1/0274; G05D 1/0246
See application file for complete search history.

(56) References Cited

U.S. PATENT DOCUMENTS

| 2019/0271549 A1* | 9/2019 | Zhang | G05D 1/0246 |
| 2022/0164595 A1* | 5/2022 | Zhou | G06V 10/757 |
| 2022/0164603 A1* | 5/2022 | Zhou | G06N 3/08 |

FOREIGN PATENT DOCUMENTS

| CN | 107871327 A | 4/2018 |
| CN | 109558879 A | 4/2019 |
| CN | 109752003 A | 5/2019 |
| CN | 110570473 A | 12/2019 |

(Continued)

OTHER PUBLICATIONS

K. Deguchi, "Optimal motion control for image-based visual servoing by decoupling translation and rotation," Proceedings. 1998 IEEE/RSJ International Conference on Intelligent Robots and Systems. (Cat. No. 98CH36190), Victoria, BC, Canada, 1998, pp. 705-707 (Year: 1998).*

(Continued)

*Primary Examiner* — Abby Y Lin
*Assistant Examiner* — Dylan Brandon Mooney
(74) *Attorney, Agent, or Firm* — W&G Law Group

(57) ABSTRACT

Provided is a globally optimal robot visual positioning method and device based on point-line features. The method comprises the following steps: acquiring a priori three-dimensional map of a current scene constructed in advance; acquiring a current image of the robot and the inertial measurement data; calculating a pitch angle and a roll angle of the current robot pose according to the current inertial sensor data and the inertial sensor data in the priori map; matching the two-dimensional point-line features detected in the current image with three-dimensional point-line features in a priori map; separating the rotation and translation of the pose to be solved according to the matched feature pairs, solving the rotation and then solving the translation so as to complete the dimensionality reduction of the search space.

5 Claims, 1 Drawing Sheet

(56) References Cited

FOREIGN PATENT DOCUMENTS

| CN | 111283730 A | 6/2020 |
|---|---|---|
| CN | 111429574 A | 7/2020 |
| CN | 111583316 A | 8/2020 |
| CN | 111595334 A | 8/2020 |
| CN | 111679291 A | 9/2020 |
| KR | 20190104304 A | 9/2019 |

OTHER PUBLICATIONS

L. Svärm, O. Enqvist, F. Kahl and M. Oskarsson, "City-Scale Localization for Cameras with Known Vertical Direction," in IEEE Transactions on Pattern Analysis and Machine Intelligence, vol. 39, No. 7, pp. 1455-1461, Jul. 1, 2017, doi: 10.1109/TPAMI.2016.2598331. (Year: 2017).*

K. Zhang, J. Chen, Y. Li and Y. Gao, "Unified Visual Servoing Tracking and Regulation of Wheeled Mobile Robots With an Uncalibrated Camera," in IEEE/ASME Transactions on Mechatronics, vol. 23, No. 4, pp. 1728-1739, Aug. 2018, doi: 10.1109/TMECH.2018.2836394. (Year: 2018).*

T. Qin, P. Li and S. Shen, "VINS-Mono: A Robust and Versatile Monocular Visual-Inertial State Estimator," in IEEE Transactions on Robotics, vol. 34, No. 4, pp. 1004-1020, Aug. 2018, doi: 10.1109/TRO.2018.2853729. (Year: 2018).*

Aladem M, Rawashdeh SA. Lightweight Visual Odometry for Autonomous Mobile Robots. Sensors. 2018; 18(9):2837. https://doi.org/10.3390/s18092837 (Year: 2018).*

International Search Report (PCT/CN2020/119891); dated Oct. 9, 2020.

* cited by examiner

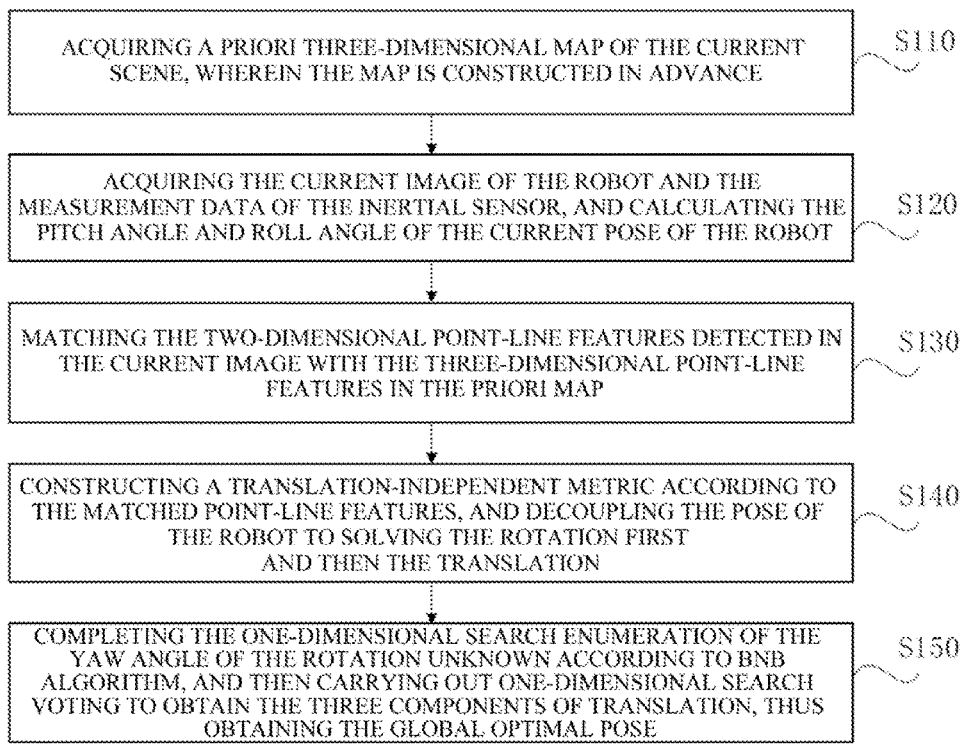

US 11,964,401 B2

ROBOT GLOBALLY OPTIMAL VISUAL POSITIONING METHOD AND DEVICE BASED ON POINT-LINE FEATURES

CROSS-REFERENCE TO RELATED APPLICATIONS

The present application is a continuation of International Application No. PCT/CN2020/119891, filed on Oct. 9, 2020, the content of which is incorporated herein by reference in its entirety.

TECHNICAL FIELD

The present application belongs to the technical field of robot positioning, and particularly relates to a globally optimal robot visual positioning method and device based on point-line features.

BACKGROUND

With the development of mobile robot technology, there are more and more kinds of tasks performed by mobile robots, and their connection with human life is getting closer and closer. At present, the application scope of mobile robots includes warehousing and logistics handling, express delivery, cleaning, inspection and monitoring, unmanned driving, etc., which greatly promotes the transformation and unmanned process of these industries. The requirement for robots is that they can achieve high-precision and long-term stable self-positioning in a relatively fixed environment, which is the prerequisite for autonomous mobile robots to complete their tasks.

Compared with a distance sensor, visual positioning technology has a low maturity, but a camera provides intuitive environmental information for human-computer interaction and is an indispensable sensor unit. The cost of a camera is very low, the cost of multiple cameras is also lower than that of a single laser, and the cameras are light and easy to integrate; although the field of view of the camera is narrow, its resolution is very high, which can fully describe the apparent information of the environment and provide better feature extraction and description. Therefore, the production cost of vision sensors is low, and the amount of information obtained is large, so the related positioning methods are widely studied and applied.

Despite the above advantages of visual positioning, mobile robots based on visual positioning still have some problems to be solved urgently in order to achieve real long-term reliable operation and meet the requirements of dynamic and changeable environment changes: narrow visual field, poor robustness to dynamic object occlusion and environment without texture; the change of the environmental appearance caused by environmental light, weather and seasonal changes will directly affect visual information; therefore, the traditional visual positioning method based on feature point matching to estimate the basic matrix of the camera is easily affected by the changes of visual angle, dynamic occlusion, environmental illumination and climate change. All of the above results in the reduction of the number of features extracted from vision, the difficulty of repeated detection and the high error rate of feature matching, which poses a great challenge to the robustness of the visual localization algorithm.

When the environment changes greatly and the error rate of matched visual features reaches 80% or more, the method based on RANSAC cannot guarantee the success rate of pose estimation. In the prior art, the guaranteed optimal algorithms based on BnB can guarantee the optimal solution under the existing feature matching condition; however, most of them implement enumeration and search in a 6DoF space, and the speed is relatively slow.

SUMMARY

The purpose of the present application is to provide a globally optimal robot visual positioning method and device based on point-line features aiming at the shortcomings of the prior art.

The present application is realized by the following technical solution: a globally optimal robot visual positioning method based on point-line features, including the following steps:

(1) acquiring a priori three-dimensional map of a current scene, including measurement data of gravity acceleration and three-dimensional point-line features;

(2) acquiring a current camera image of the robot and the measured gravity acceleration;

(3) calculating a pitch angle and a roll angle of a current pose of the robot according to the currently measured gravity acceleration of the robot and the measurement data of gravity acceleration in the priori three-dimensional map; detecting two-dimensional point-line features of the current camera image of the robot, and matching the detected two-dimensional point-line features with the three-dimensional point-line features in the priori three-dimensional map;

(4) constructing translation-independent metrics according to the matched two-dimensional to three-dimensional point-line features, and decoupling a robot pose solving problem into two sub-problems of rotation and translation, that is, solving a rotation unknown and then solving a translation unknown, wherein, the rotation unknown is a yaw angle, which is solved by one-dimensional search enumeration completed by a branch-and-bound algorithm, and the translation unknown is solved by one-dimensional search voting on components in three directions thereof respectively; finally, obtaining an optimal solution of global pose estimation.

Furthermore, in step (3), the gravity acceleration $[x_c\ y_c\ z_c]^T$ measured in an coordinate system of the robot and the gravity acceleration $[x_w\ y_w\ z_w]^T$ measured in an coordinate system of the priori three-dimensional map are aligned to obtain the pitch angle $\beta$ and the roll angle $\gamma$ of the current coordinate system of the robot relative to the coordinate system of the priori three-dimensional map, which is specifically as follows:

$$\begin{bmatrix} 1 & 0 & 0 \\ 0 & \cos(\gamma) & -\sin(\gamma) \\ 0 & \sin(\gamma) & \cos(\gamma) \end{bmatrix} \begin{bmatrix} \cos(\beta) & 0 & \sin(\beta) \\ 0 & 1 & 0 \\ -\sin(\beta) & 0 & \cos(\beta) \end{bmatrix} \begin{bmatrix} x_c \\ y_c \\ z_c \end{bmatrix} = \begin{bmatrix} x_w \\ y_w \\ z_w \end{bmatrix}.$$

Furthermore, in step (3), a distance between corresponding descriptors of the two-dimensional point-line features of the current image of the robot and the three-dimensional point-line features of the priori three-dimensional map in a certain metric space is calculated, and the features the distance of which is less than a preset threshold value are matched to obtain a plurality of pairs of matched features.

Furthermore, in step (4), a point $p_i$ in the three-dimensional map and a corresponding matched point $u_i$ in a two-dimensional image satisfy the following relationship:

$$u_i = \pi(Rp_i + t, K) + o_i + e_i$$

where R is a rotation matrix, $\pi$ is an camera projection equation of a camera internal reference K, $e_i$ is observation noise; a wrong match is an outer point, a correct match is an inner point, $o_i$ is zero for the inner point and is arbitrary for the outer point; the problem of robot pose estimation is transformed into a problem of a maximizing consensus set:

$$\max_{R,t,\{z_i\}} \sum z_i$$
$$\text{s.t. } z_i|u_i - \pi(Rp_i + t, K)| \le n_i, i \in \mathfrak{B}$$

where t is a translation vector; $z_i=0$ means $o_i$ is 0, $z_i=1$ means $o_i$ is not 0; $n_i > |e_i|$ is a bound of the observation noise; $\mathfrak{B}$ is a set of three-dimensional to two-dimensional matched point features.

Furthermore, in step (4), a non-normalized vector $\tilde{u}_i$ is obtained from a center of the camera according to the point $u_i$ in the two-dimensional image:

$$\tilde{u}_i \triangleq \begin{pmatrix} \tilde{u}_{i,x} \\ \tilde{u}_{i,y} \\ 1 \end{pmatrix} = K^{-1} \begin{pmatrix} u_i \\ 1 \end{pmatrix}$$

the point $p_i$ in the three-dimensional map corresponding to the point $u_i$ in the two-dimensional image is transformed into a coordinate system of the camera:

$$\frac{R_1 p_i + t_x}{\tilde{u}_{i,x}} = \frac{R_2 p_i + t_y}{\tilde{u}_{i,y}} = R_3 p_i + t_z$$

where $R \triangleq (R_1^T, R_2^T, R_3^T)^T$, $t \triangleq (t_x, t_y, t_z)^T$; two constraints are obtained from the above formula, and two constraints are further obtained similarly from another group of three-dimensional to two-dimensional matched features, and a translation amount t is eliminated by combining the above four constraints to obtain a translation-independent metric $d_p(\alpha)$ derived from feature matching points:

$$d_p(\alpha) = d_{p,1} \sin\alpha + d_{p,2} \cos\alpha + d_{p,3}$$

where $d_{p,1}$, $d_{p,2}$, $d_{p,3}$ are coefficients of $d_p(\alpha)$; $\alpha$ is the yaw angle; the robot pose estimation problem is transformed into the following maximizing consensus set problem:

$$\max_{R(\alpha),\{z_{ij}\}} \sum z_{ij}$$
$$\text{s.t. } z_{ij}|d_{p,ij}(\alpha)| \le n_{ij}, i, j \in \mathfrak{B}$$

where $n_{ij} = \min(n_i, n_j)$; $z_{ij}=1$ means that feature matching points of an $i^{th}$ group and a $j^{th}$ group are all inner points, otherwise, $z_{ij}=0$.

Furthermore, in step (4), two ends $\tilde{u}_{k1}$ and $\tilde{u}_{k2}$ of a two-dimensional line segment and a point $p_k$ on a corresponding three-dimensional line segment satisfy the following relationship:

$$(\tilde{u}_{k1} \times \tilde{u}_{k2})^T (Rp_k + t) = 0$$

a constraint is obtained from the above formula, another point on the three-dimensional line segment is arbitrarily taken to obtain another constraint, and the translation amount t is eliminated by combining the above two constraints to obtain a translation-independent metric $d_l(\alpha)$ derived from line feature matching:

$$d_l(\alpha) = d_{l,1} \sin\alpha + d_{l,2} \cos\alpha + d_{l,3}$$

where $d_{l,1}$, $d_{l,2}$, $d_{l,3}$ are coefficients of $d_l(\alpha)$; the robot pose estimation problem is transformed into the following maximizing consensus set problem:

$$\max_{R(\alpha),\{z_*\}} \sum z_*$$
$$\text{s.t. } z_{ij}|d_{p,ij}(\alpha)| \le n_{ij}, i, j \in \mathfrak{B}$$
$$z_k|d_{l,k}(\alpha)| \le n_k, k \in \mathfrak{L}$$

where $z_*$ is used to refer to $z_{ij}$ and $z_k$; $z_k=1$ indicates that the feature matching corresponding to a $k^{th}$ line feature is an inner point, and $z_{ij}=1$ indicates that the feature matchings corresponding to $i^{th}$ and $j^{th}$ point features are inner points; $\mathfrak{L}$ is a set of line features, and $n_k$ is a bound of the observation noise corresponding to the $k^{th}$ line feature.

Furthermore, in step (4), $d_p(\alpha)$ and $d_l(\alpha)$ are unified as a translation-independent metric $d(\alpha)$:

$$d(\alpha) = d_1 \sin\alpha + d_2 \cos\alpha + d_3$$
$$= \sqrt{d_1^2 + d_2^2}(\sin\alpha \cos a_2 + \cos\alpha \sin a_2) + d_3$$
$$= a_1 \sin(\alpha + a_2) + d_3$$
$$a_1 = \sqrt{d_1^2 + d_2^2}, \sin a_2 = \frac{d_2}{d_1}, \cos a_2 = \frac{d_1}{a_1}$$

where, $d_1$, $d_2$, $d_3$ are coefficients of $d(\alpha)$; a lower bound $\underline{d}(A)$ of the translation-independent metric of the yaw angle $\alpha$ is:

$$\underline{d}(A) = \min|a_1 \sin(\alpha + a_2) + d_3|$$

where A is an interval subset including the yaw angle $\alpha$, $\alpha \in A$; the maximizing consensus set problem corresponding to $\underline{d}(A)$ is:

$$\max_{R(\alpha),\{z_*\},\alpha \in A} \sum z_*$$

-continued s.t. $z_{ij}\underline{d}_{p,ij}(A) \leq n_{ij}, i, j \in \mathcal{B}$ $z_k \underline{d}_{l,k}(A) \leq n_k, k \in \mathcal{L}$ where, $\underline{d}_{p,ij}(A)$ is a translation-independent metric derived from point features on A, and $\underline{d}_{l,k}(A)$ is a translation-independent metric derived from line features on A; a number of inner points in the consensus set corresponding to the yaw angle α is recorded as an energy function E(α), and an upper bound of E(α) is recorded as $\overline{E}(A)$:

$$E(\alpha) \leq \overline{E}(A) = \sum \hat{z}_*, \alpha \in A$$

where, $\hat{z}_*$ is a number of inner points of the optimal consensus set obtained by solving the maximizing consensus set problem;

a whole global optimal rotation solving comprises the following steps: initializing a range [−π, π] of the yaw angle into a plurality of subsets A, the plurality of subsets A forming a sequence q, and initializing an optimal value of the energy function and an optimal value of the yaw angle; before q is empty, cyclically executing the following operations: taking out a first subset A of q to calculate $\overline{E}(A)$, wherein if $\overline{E}(A)$ is greater than a current optimal value of the energy function, $E(\alpha_c)$ is calculated according to a center $\alpha_c$ of the subset A, while if $E(\alpha_c)$ is also greater than the current optimal value of the energy function, the current optimal value of the energy function is updated as $E(\alpha_c)$ and the current optimal value of the yaw angle is $\alpha_c$; otherwise, continuing to traverse remaining subsets A until q is empty, and returning to a final optimal value of the yaw angle.

Furthermore, in step (4), when the yaw angle is known, the maximizing consensus set problem regarding the translation amount is:

$$\max_{t,\{z_i\}} \sum z_i$$

s.t. $z_i|A_i t + b_i| \leq n_i, i \in \mathcal{B} \cup \mathcal{L}$ where, $A_i$ and $b_i$ are coefficients of a linear function regarding the translation amount corresponding to the known yaw angle;

according to a set of three-dimensional to two-dimensional matched features with at least one point feature, the maximizing consensus set problem regarding the translation amount is updated as follows:

$$\max_{t,\{z_{ij}\}} \sum z_{ij}$$

s.t. $z_{ij}|\hat{t}_{ij} - t| \leq n_{ij}, i \in \mathcal{B}, j \in \mathcal{B} \cup \mathcal{L}$ where $\hat{t}_{ij}$ is an estimation of the translation amount; the translation amount is decoupled into three components in x, y and z directions, and the maximizing consensus set problem regarding the translation amount in x direction is as follows:

$$\max_{t_x,\{z_{ij}\}} \sum z_{ij}$$

s.t. $z_{ij}|\hat{t}_{ij,x} - t_x| \leq n_{ij,x}, i \in \mathcal{B}, j \in \mathcal{B} \cup \mathcal{L}$ similarly, the maximizing consensus set problem regarding the translation amount in y and z directions can be obtained; according to geometric constraints, all feature combinations are traversed to obtain all possible $\hat{t}_{ij}$ and corresponding upper bounds $\bar{t}_{ij}$ and lower bounds $\underline{t}_{ij}$ thereto; by voting for all $\hat{t}_{ij}$, a feature matching support set of consistent estimation results is obtained, and then a global optimal translation estimation is obtained;

a whole global optimal translation solving comprises the following steps: initialize the optimal value of the energy function as 0 according to all translation estimation results and corresponding upper and lower bounds thereto, wherein an optimal inner point set is empty; voting for a translated x component to obtain all voting results and a corresponding voting feature set $S_x$, and sorting the set in a descending order according to a size of the feature set; traversing each voting result in $S_x$ and feature set $S_x([i])$: ending if the size of the feature set is less than the optimal value of the current energy function, and proceeding to the next step if the size of the feature set is no less than the optimal value of the current energy function; voting for all elements in the feature set of $S_x([i])$ in a translation y component to obtain a set $S_y$; traversing each voting set and feature set $S_y([j])$ in $S_y$: ending if the size of the feature set is less than the optimal value of the current energy function, it will end, and proceeding to the next step if the size of the feature set is no less than the optimal value of the current energy function; voting for all elements in the feature set $S_y([j])$ in a translation z component to obtain a set $S_z$; if the size of the voting feature set corresponding to a result of a maximum voting number in $S_z$ is larger than the optimal value of the current energy function, updating a larger value to the optimal value of the current energy function, updating the corresponding feature set to a current optimal inner point set, and continuing to traverse; otherwise, continuing to traverse directly instead of updating.

Furthermore, the two-dimensional point-line features comprise two-dimensional point features and two-dimensional line features; a method for detecting the two-dimensional point features comprises ORB, SIFT, LBP and HOG feature point detection algorithms; a method for detecting the two-dimensional line features comprises LBD, Edline and Hough line detections; the distance of the certain metric space is an Euclidean distance.

A globally optimal robot visual positioning device based on the above method includes:

a first acquisition module configured to acquire a priori three-dimensional map of the current scene and measurement data of gravity acceleration;

a second acquisition module configured to acquire a current camera image and the measured gravity acceleration of the robot;

a first calculation module configured to calculate a pitch angle and a roll angle of a pose of the robot according to the measured gravity acceleration of the robot and the measurement data of the gravity acceleration in the priori three-dimensional map;

a matching module configured to match two-dimensional point-line features detected in the current camera image of the robot with three-dimensional point-line features in the priori three-dimensional map to obtain a plurality of two-dimensional to three-dimensional point-line feature matching pairs; and a second calculation module configured to separate rotation and translation of the pose of the robot to be solved according to the acquired point-line feature matching pairs, solve the rotation and then solve the translation, thereby completing dimension reduction of a search space and obtaining an accurate estimation result.

Compared with the prior art, the present application has the following beneficial effects:

According to the method, point features and line features in the environment are simultaneously utilized during positioning, information provided by vision is maximally utilized, and the range of application scenarios are wider. Compared with point features, line features are a kind of higher semantic information, which has a more stable detection effect. Even in the case of partial occlusion, some line segments can be detected, and they are insensitive to illumination and climate change, which can make up for the deficiency of point features to a great extent. Especially in the artificial environment (e.g., factories) where the visual point features are not so abundant, the line features tend to be easier to detect and more numerous, and their advantages are more obvious. In the wild natural environment, under the condition that the line features are not so obvious, the present application also supports positioning methods of two feature point pairs, and the robot pose can be accurately estimated only by matching two groups of corresponding three-dimensional feature points on the map in the current image of the robot, so that the application scenarios are very wide, and the self-adaptive ability of the robot to the environment can be effectively improved.

According to the present application, the BnB-based guaranteed optimal algorithm is studied, and the rotation and translation of the pose to be solved are separated, i.e., the rotation is solved firstly and then translation is solved, so that the dimension of the search space is reduced, the search of the six-dimensional camera pose space is reduced to the search of four one-dimensional spaces, and the operation speed is improved while the optimal solution is guaranteed. According to the present application, the advantage information of each sensor is brought into full play in the algorithm by utilizing the fusion of multiple sensors, and finally the positioning accuracy and robustness are improved.

BRIEF DESCRIPTION OF DRAWINGS

FIG. 1 is a schematic flow chart of a globally optimal robot vision positioning method based on point-line features.

DESCRIPTION OF EMBODIMENTS

The technical solution of the present application will be further described below with reference to the drawings and specific embodiments.

According to the matching relationship between two groups of point features, an equation only related to the rotation unknown quantity can be obtained; correspondingly, in the case of a group of matched line segments, an equation only related to rotation can be obtained. Therefore, the solution of rotation and translation in the present application can be separated into solving rotation first and then solving translation; in addition, using inertial measurement data, the unknown rotation amount can be reduced to be only one yaw angle, wherein, the Branch-and-bound (BnB) algorithm is used to solve the unknown rotation amount (the yaw angle), which completes one-dimensional search enumeration, while the three components of translation respectively conduct one-dimensional search and vote, and finally an optimal solution of global pose estimation is obtained. The key is to give the state space range to be solved and obtain the upper and lower bounds of the matching number of correct features. Then, according to the equation only related to yaw angle derived from point-line features, if the specific value of a certain yaw angle is arbitrarily given and the error of correct feature matching is given, then all point-line features can be traversed, and the number of correct matched features can be obtained by statistics. In the same way, by giving a certain range of the yaw angle, the bound of the corresponding equation can be readily obtained, thereby solving the maximum matching number of correct features in this range. Therefore, the range of the yaw angle to be calculated can be initiated as $(-\pi, \pi]$, and the optimal yaw angle that maximizes the matching number of correct features can be found by narrowing the range of the yaw angle in two parts.

Since the observation is accompanied by a certain degree of noise, it is assumed that the noise of the coordinates of the observed image features is bounded noise. By constructing the constraint of collinear points and coplanar lines, the constraint of translation unknown and feature matching can be constructed on the premise of solving the rotation. According to the constraints of construction, the bounded noise on observation can be deduced to the translation to be solved, and the bound of the translation to be solved can be obtained. That is to say, given certain point and line or two points, according to geometric constraints, corresponding translation amount and the bound thereof can be calculated. Then all possible translation estimation results and their corresponding bounds can be obtained by traversing all feature combinations.

FIG. 1 is a schematic flow diagram of a globally optimal robot vision positioning method based on point-line features of the present application, which includes the following steps:

A priori three-dimensional map of the current scene is acquired, wherein the map is constructed in advance by any number of cameras and inertial sensors, and the map is required to include the measurement data of gravity acceleration in the map coordinate system, which is generally measured by inertial sensors, and specifically, the acceleration data measured by inertial sensors is saved while determining the map coordinate system; the three-dimensional map also contains three-dimensional point-line features, so that it can be matched with the two-dimensional point-line features in the current image of the robot during subsequent positioning; the specific generation method of three-dimensional point-line features is not limited, and as a preferred embodiment, they can be obtained according to the following steps: the three-dimensional point features can be obtained by triangulating the two-dimensional point features detected by the image during mapping, or the three-dimensional line features can be directly obtained by Line3Dpp algorithm processing in the constructed three-dimensional map;

A current image of the robot and the inertial measurement data is acquired;

According to the inertial sensor data of the current robot and the inertial sensor data in the priori three-dimensional map, the pitch angle and roll angle of the current robot pose are calculated as follows:

the measured data of the inertial sensor of the robot in the current image is the measured value of gravity acceleration in the robot coordinate system of the current image; the measured data of the inertial sensor in the priori three-dimensional map is the measured value of gravity acceleration in the priori three-dimensional map coordinate system; the measured values of gravity acceleration in the two coordinate systems are aligned so as to obtain the pitch angle and roll angle of the current robot coordinate system relative to the map coordinate system, which are calculated according to the following formula:

$$\begin{bmatrix} 1 & 0 & 0 \\ 0 & \cos(\gamma) & -\sin(\gamma) \\ 0 & \sin(\gamma) & \cos(\gamma) \end{bmatrix} \begin{bmatrix} \cos(\beta) & 0 & \sin(\beta) \\ 0 & 1 & 0 \\ -\sin(\beta) & 0 & \cos(\beta) \end{bmatrix} \begin{bmatrix} x_c \\ y_c \\ z_c \end{bmatrix} = \begin{bmatrix} x_w \\ y_w \\ z_w \end{bmatrix} \quad (1)$$

where $[x_w \ y_w \ z_w]^T$ is the measured value of gravity acceleration in the coordinate system of the priori three-dimensional map, $[x_c \ y_c \ z_c]^T$ is the measured value of the gravity coordinate system in the robot coordinate system of the current image, $\beta$, $\gamma$ are the pitch angle and roll angle of the robot coordinate system of the current image relative to the coordinate system of the priori three-dimensional map.

Matching is performed according to the two-dimensional point-line features detected in the current camera image and the three-dimensional point-line features in the priori three-dimensional map, and the specific implementation steps are as follows:

a plurality of two-dimensional feature points are detected according to the current image acquired by the robot, and the detection method of the two-dimensional feature points is not limited; as a preferred embodiment, it can specifically be an ORB, SIFT, LBP or HOG feature point detection algorithm;

a plurality of two-dimensional line segments are detected according to the current image acquired by the robot, wherein the detection method of the two-dimensional line segments is not limited, and can be specifically LBD, Edline or Hough line detection as a preferred embodiment;

matching is performed according to the two-dimensional point-line feature of the current image and the three-dimensional point-line feature in the map, which is embodied by calculating the distance of the corresponding descriptor in a certain metric space; as a preferred embodiment, it can be taken as an Euclidean distance; the features whose distance is less than the preset threshold range (8 in this embodiment) are considered to be successful in matching, so multiple groups of matched two-dimensional-to-three-dimensional point-line features are iteratively acquired.

According to the matched two-dimensional-to-three-dimensional point features and line features, the remaining unknowns of the current robot pose are calculated, which is specifically divided into the following implementation situations:

visual inertial positioning is a kind of pose estimation in matching from three-dimensional to two-dimensional features including several wrong matches (i.e., outer points), and when a group of three-dimensional map points and a group of corresponding two-dimensional visual points are given, they satisfy:

$$u_i = \pi(Rp_i + t, K) + o_i + e_i \quad (2)$$

where R is a rotation matrix, t is a translation vector, $\pi$ is an camera projection equation of a camera internal reference K, $|e_i| < n_i$ is assumed observation noise, $n_i$ is the bound of the observation noise; is zero for correct feature matching (that is, an inner point) and is an arbitrary value for an outer point. In order to deal with these outer points, the robust pose estimation problem can be transformed into a maximizing consensus set problem:

$$\max_{R,t,\{z_i\}} \sum z_i \quad (3)$$
$$\text{s.t. } z_i |u_i - \pi(Rp_i + t, K)| \le n_i, i \in \mathcal{B}$$

where $z_i$ is 0 or 1, which is use to indicate whether is 0 or not; $\mathcal{B}$ is a set of feature matching from three-dimensional to two-dimensional points.

2) According to a given two-dimensional image point, a non-normalized vector can be obtained from the center of the camera:

$$\tilde{u}_i \triangleq \begin{pmatrix} \tilde{u}_{i,x} \\ \tilde{u}_{i,y} \\ 1 \end{pmatrix} = K^{-1} \begin{pmatrix} u_i \\ 1 \end{pmatrix} \quad (4)$$

where $\tilde{u}_i$ is a non-normalized vector representation of the two-dimensional image point, $\tilde{u}_{i,x}$ is the abscissa of the vector $\tilde{u}_i$, and $\tilde{u}_{i,y}$ is the ordinate of the vector.

Afterwards, the three-dimensional points corresponding to the two-dimensional image points are transformed into the camera coordinate system and satisfy the following requirements:

$$\frac{R_1 p_i + t_x}{\tilde{u}_{i,x}} = \frac{R_2 p_i + t_y}{\tilde{u}_{i,y}} = R_3 p_i + t_z \quad (5)$$

where $R \triangleq (R_1^T, R_2^T, R_3^T)^T$, $t \triangleq (t_x, t_y, t_z)^T$, i.e., $R_1$, $R_2$, $R_3$ are the three row vectors of the rotation matrix R, and $t_x$, $t_y$, $t_z$ are the three coordinate axis components of the translation vector t.

Two constraints can be obtained from the three-dimensional to two-dimensional matched point features in the above formula (5). Given another group of three-dimensional to two-dimensional matched features $u_j$ and $p_j$, the following two new constraints can be obtained:

$$\frac{R_1 p_j + t_x}{\tilde{u}_{j,x}} = \frac{R_2 p_j + t_y}{\tilde{u}_{j,y}} = R_3 p_j + t_z \quad (6)$$

By combining the constraints of the above formulas (5) and (6), the translation amount can be eliminated. Therefore, given two groups of three-dimensional to two-dimensional matched point features, a translation-independent metric can be derived:

$$d_p(\alpha) = d_{p,1} \sin\alpha + d_{p,2} \cos\alpha + d_{p,3} \quad (7)$$

where $d_p(\alpha)$ is the representation of the translation-independent metric derived from point features, and $d_{p,1}(\alpha)$, $d_{p,2}(\alpha)$, $d_{p,3}(\alpha)$ are the coefficients of the translation-independent metric $d_p(\alpha)$; $\alpha$ is an unknown yaw angle; since the global pitch angle and roll angle are known in the inertial measurement, the unknown quantity in this formula is only the yaw angle. In this way, the aforementioned problem can be transformed into a new maximizing consensus set problem:

$$\max_{R(\alpha),\{z_{ij}\}} \sum z_{ij} \qquad (8)$$
$$\text{s.t. } z_{ij}|d_{p,ij}(\alpha)| \le n_{ij}, i, j \in \mathcal{B}$$

where i,j correspond to two pairs of feature matching points; $d_{p,ij}(\alpha)$ is a translation-independent metric $d_p(\alpha)$ constructed by feature matching of the $i^{th}$ and $j^{th}$ points, $R(\alpha)$ represents the rotation matrix determined by the unknown yaw angle $\alpha$, $n_{ij}=\min(n_i, n_j)$; $z_{ij}=1$ indicates that the feature matchings corresponding to the $i^{th}$ and $j^{th}$ point features are inner points, otherwise $z_{ij}=0$.

3) According to a given point on a three-dimensional line segment, the two ends of the two-dimensional line segment corresponding to the three-dimensional line segment are $\tilde{u}_{k1}$ and $\tilde{u}_{k2}$ then, $$(\tilde{u}_{k1} \times \tilde{u}_{k2})^T (Rp_k + t) = 0 \qquad (9)$$

Another point on the three-dimensional line segment is taken. Similarly, according to the formula (9), another equation can be obtained, and the translation amount can be eliminated by combining the two equations corresponding to the above formula (9). Then a matched three-dimensional to two-dimensional line segment can give a translation-independent metric:

$$d_l(\alpha) = d_{l,1}\sin\alpha + d_{l,2}\cos\alpha + d_{l,3} \qquad (10)$$

where $d_l(\alpha)$ is the representation of the translation-independent metric derived from line segment features, and $d_{l,1}$, $d_{l,2}$, $d_{l,3}$ are the coefficients of the translation-independent metric $d_l(\alpha)$.

By combining the information of formulas (8) and (10) above, the problem can be transformed into a new maximizing consensus set problem:

$$\max_{R(\alpha),\{z_*\}} \sum z_* \qquad (11)$$
$$\text{s.t. } z_{ij}|d_{p,ij}(\alpha)| \le n_{ij}, i, j \in \mathcal{P}$$
$$z_k|d_{l,k}(\alpha)| \le n_k, k \in \mathcal{L}$$

where, $z_*$ is the representation of a z value corresponding to any point line feature, $z_k$ is the representation of the z value corresponding to the $k^{th}$ line feature, and $z_{ij}$ is the representation of the z value corresponding to the $i^{th}$ and $j^{th}$ point features, that is, $z_k$ and $z_{ij}$ constitute $z_*$; $d_{l,k}(\alpha)$ is a translation-independent metric $d_l(\alpha)$ obtained from the $k^{th}$ line feature, $d_{p,ij}(\alpha)$ is a translation-independent metric $d_p(\alpha)$ obtained from the $i^{th}$ and $j^{th}$ point features, $\mathcal{L}$ is a set of line features, $n_k$ is the bound of the observation noise corresponding to the $k^{th}$ line feature, and $n_{ij}$ is the bound of the observation noise corresponding to the $i^{th}$ and $j^{th}$ point features.

4) The objective function of maximizing consensus set problem is derived from formula (11), where the unknowns include the yaw angle $\alpha$ and the $\{z_*\}$ set corresponding to all the point-line features, i.e., the consensus set $\{z_i\}$. In addition, it is not difficult to figure out that the corresponding consensus set $\{z_i\}$ can be uniquely determined. This correspondence can be represented as an energy function $E(\alpha)$, which represents the number of features in the corresponding consensus set when the yaw angle is $\alpha$. Next, the upper bound of the energy function $E(\alpha)$ under the subset $A(\alpha \in A)$ of the yaw angle, which is defined as $\overline{E}(A)$. According to formulas (8) and (10), it can be seen that the forms of the translation-independent metrics derived from point features and line features are the same, so the translation-independent metrics are collectively referred to $d(\alpha)$, and then $$d(\alpha) = d_1 \sin\alpha + d_2 \cos\alpha + d_3 \qquad (12)$$
$$= \sqrt{d_1^2 + d_2^2}(\sin\alpha\cos a_2 + \cos\alpha\sin a_2) + d_3$$
$$= a_1 \sin(\alpha + a_2) + d_3$$

where, $d_1$, $d_2$, $d_3$ are the coefficients of the unified translation-independent metric $d(\alpha)$, and $$a_1 = \sqrt{d_1^2 + d_2^2}, \sin a_2 = \frac{d_2}{a_1}, \cos a_2 = \frac{d_1}{a_1}.$$

Then, the lower bound $\underline{d}(A)$ of the metric of the yaw angle $\alpha$ to be solved can be defined as:

$$\underline{d}(A) = \min|a_1 \sin(\alpha + a_2) + d_3| \qquad (13)$$

where A is the interval containing the yaw angle $\alpha$.

Its corresponding maximizing consensus set problem becomes:

$$\max_{R(\alpha),\{z_*\},\alpha\in A} \sum z_* \qquad (14)$$
$$\text{s.t. } z_{ij}\underline{d}_{p,ij}(A) \le n_{ij}, i, j \in \mathcal{P}$$
$$z_k\underline{d}_{l,k}(A) \le n_k, k \in \mathcal{L}$$

where, $\underline{d}_{p,ij}(A)$ is a translation-independent metric constructed from the point features in the angle interval A and $\underline{d}_{l,k}(A)$ is a translation-independent metric constructed from the line features in angle interval A.

Accordingly, the strict upper bound $\overline{E}(A)$ can be deduced:

$$E(\alpha) \le \overline{E}(A) = \sum \hat{z}_*, \alpha \in A \qquad (15)$$

where, $\hat{z}_*$ is the set of z values corresponding to the maximum value of formula (14), that is, the optimal consensus set.

The whole global optimal rotation solving comprises the following steps: initializing a range $[-\pi, \pi]$ of the yaw angle into a plurality of subset A intervals, initializing optimal values of the energy function and the yaw angle, initiating an empty sequence q, inserting all subset A intervals into the sequence q; until q is empty, always taking out the first subset A interval of q and calculating the upper bound $\overline{E}(A)$ of the energy function according to formula (15); if the upper bound is greater than the current optimal value of the energy function, setting the center of the subset A interval as $\alpha_c$, and calculating the energy function $E(\alpha_c)$ according to formula (11); if the energy function $E(\alpha_c)$ is greater than the current optimal value of the energy function, updating the optimal value of the energy function as $E(\alpha_c)$ and the optimal value of the yaw angle as $\alpha_c$; otherwise, continuing to circularly traversing all subset A intervals until q is empty to end the cycle and returning the optimal value of the yaw angle.

5) When the rotation has been estimated, the problem of maximizing consensus set of translation to be solved is updated as follows:

$$\max_{t,\{z_i\}} \sum z_i \qquad (16)$$

$$\text{s.t. } z_i|A_i t + b_i| \le n_i, i \in \mathfrak{P} \cup \mathcal{L}$$

where, $A_i$ and $b_i$ are the coefficients of the linear function about the translation amount obtained by substituting the optimal rotation amount $\alpha_c$ by formulas (5) and (9).

For a three-dimensional to two-dimensional feature matching points, there are two independent constraints on translation, which are derived from formula (5). For a three-dimensional to two-dimensional line feature matching, there is one constraint on translation, which is derived from formula (9). Therefore, given a group of three-dimensional to two-dimensional matching features with at least one point feature, including the $i^{th}$ two-dimensional to three-dimensional point feature and the $j^{th}$ point feature or line feature, it is enough to solve the translation variable $\hat{t}_{ij}$, and at this time, the problem is updated as:

$$\max_{t,\{z_{ij}\}} \sum z_{ij} \qquad (17)$$

$$\text{s.t. } z_{ij}|\hat{t}_{ij} - t| \le n_{ij}, i \in \mathfrak{P}, j \in \mathfrak{P} \cup \mathcal{L}$$

where $\hat{t}_{ij}$ is a translation estimation result. At this time, this problem decouples each dimension of translation vector t.

Translation t is decoupled into three components in x, y and z directions. Taking the translation component $t_x$ in the x direction as an example, then:

$$\max_{t_x,\{z_{ij}\}} \sum z_{ij} \qquad (18)$$

$$\text{s.t. } z_{ij}|\hat{t}_{ij,x} - t_x| \le n_{ij,x}, i \in \mathfrak{P}, j \in \mathfrak{P} \cup \mathcal{L}$$

According to the above formula (18), the linear maximizing consensus set problem with three dimensions (corresponding to three components) can be obtained. According to geometric constraints, corresponding translation and its upper and lower bounds can be solved. By traversing all feature combinations, all possible translation estimation results $\hat{t}_{ij}$ and their corresponding upper and lower bounds $\overline{t}_{ij}$, $\underline{t}_{ij}$ thereof can be obtained:

$$\underline{t}_{ij} \le \hat{t}_{ij} \le \overline{t}_{ij} \qquad (19)$$

Since there are a certain number of correct feature matchings in feature matching, the translation of correct feature matching estimation is consistent, while the translation amount of wrong matching estimation is disordered. By voting for all translation estimation results, a feature matching support set of consistent estimation results can be obtained, thereby obtaining the global optimal translation estimation.

Specifically, the whole global optimal translation solving step is as follows: calculate all translation estimation results and their corresponding upper and lower bounds, initialize the optimal value of energy function as 0, and the optimal inner point set is empty. Vote the translated X component and get all voting results and corresponding voting feature sets, which are arranged in descending order according to the size of feature sets. Traverse each voting result and feature set: if the feature set size is smaller than the current optimal energy function value, end; Otherwise not less than, continue to the next step. Vote for all elements in the feature set in translation y component to get the set; Traverse each voting set and feature set: if the feature set size is smaller than the current optimal energy function value, end; Otherwise not less than, continue to the next step. Vote for all elements in the feature set in translation z component to get the set; If the size of the voting feature set corresponding to the maximum voting number result is larger than the current optimal energy function value, update the optimal energy function value and the optimal inner point set, and continue to traverse; Otherwise, if it is not greater than, continue traversing directly without updating. Until the end instruction is met, the average value of the optimal inner point set and its corresponding translation value is returned as the translation optimal value.

Specifically, a whole global optimal translation solving comprises the following steps: calculating all translation estimation results and corresponding upper and lower bounds thereto, and initializing the optimal value of the energy function as 0, wherein an optimal inner point set is empty; voting fora translated x component to obtain all voting results and a corresponding voting feature set $S_x$, and sorting the set in a descending order according to a size of the feature set; traversing each voting result in $S_x$ and feature set $S_x([i])$: ending if the size of the feature set is less than the optimal value of the current energy function, and proceeding to the next step if the size of the feature set is no less than the optimal value of the current energy function; voting for all elements in the feature set of $S_x([i])$ in a translation y component to obtain a set $S_y$; traversing each voting set and feature set $S_y([j])$ in $S_y$: ending if the size of the feature set is less than the optimal value of the current energy function, it will end, and proceeding to the next step if the size of the feature set is no less than the optimal value of the current energy function; voting for all elements in the feature set $S_y([j])$ in a translation z component to obtain a set $S_z$; if the size of the voting feature set corresponding to a result of a maximum voting number in $S_z$ is larger than the optimal value of the current energy function, updating a larger value as the optimal value of the current energy function, updating the corresponding feature set as the current optimal inner point set, and continuing to traverse; otherwise, continuing to traverse directly instead of updating.

The present application relates to a globally optimal robot vision positioning device, which includes a camera unit and an inertial measurement unit, wherein, that camera unit is use for acquiring the current image of the robot; the inertial measurement unit is used to measure the value of gravity acceleration in the current robot coordinate system and align it with the measured value of gravity acceleration in the priori three-dimensional map, so as to obtain the pitch angle and roll angle of the pose of the robot. The relative relationship between the camera and inertial measurement unit has been calibrated in advance. The positioning device also includes a processor, a memory and a program stored in the memory, and when the computer program is executed by the processor, the steps of realizing the vision inertial point-line feature positioning method for the robot are implemented.

The operations of acquiring the current image of the robot the camera unit, acquiring the acceleration and angular acceleration from the inertial measurement unit (IMU, including a gyroscope and an accelerometer), extracting feature points and line segments in the steps, matching visual feature points and line segments with three-dimensional feature points and line segments in the map, and calculating the pose of the robot according to matched feature point and lines are all algorithms, which are completed on the processor or computer carried by the robot.

The method in this embodiment and the device in the foregoing embodiment are based on two aspects under the same inventive concept, and those skilled in the art can clearly understand the structure and implementation process of the system in this embodiment according to the foregoing description.

For convenience of description, when describing the above devices, the functions are divided into various modules. Of course, when the present application is implemented, the functions of each module can be implemented in one or more pieces of software and/or hardware. The specific functions of each module are as follows:
  a first acquisition module configured to acquire a priori three-dimensional map of the current scene and measurement data of gravity acceleration;
  a second acquisition module configured to acquire a current camera image and the measured gravity acceleration of the robot;
  a first calculation module configured to calculate a pitch angle and a roll angle of a pose of the robot according to the measured gravity acceleration of the robot and the measurement data of the gravity acceleration in the priori three-dimensional map;
  a matching module configured to match two-dimensional point-line features detected in the current camera image of the robot with three-dimensional point-line features in the priori three-dimensional map to obtain a plurality of two-dimensional to three-dimensional point-line feature matching pairs; and
  a second calculation module configured to separate rotation and translation of the pose of the robot to be solved according to the acquired point-line feature matching pairs, solve the rotation first and then solve the translation, thereby completing dimension reduction of a search space and obtaining an accurate estimation result.

From the description of the above embodiments, those skilled in the art can clearly understand that the present application can be realized by means of software together with necessary general hardware platform. Based on this understanding, the technical solution of the present application can be embodied in the form of software products, which can be stored in storage media, such as a ROM/RAM, a magnetic disk, an optical disk, etc., and include several instructions to make a computer device execute the methods described in various embodiments or some parts of embodiments of the present application, and the computer device can be a personal computer, a server, or a network device, etc.

The described device embodiments are only for illustration, in which the modules or units described as separated components may or may not be physically separated, and the components illustrated as modules or units may or may not be physical modules, which may be located in one place or distributed to multiple network modules. Some or all of the units can be selected according to actual needs to achieve the purpose of the embodiment. Those skilled in the art can understand and implement the embodiment without creative labor.

The present application can be used in many general-purpose or special-purpose computing system environments or configurations. Examples are personal computers, server computers, handheld or portable devices, tablet devices, multiprocessor systems, microprocessor-based systems, set-top boxes, programmable consumer electronics devices, network PCs, minicomputers, mainframe computers, distributed computing environments including any of the above systems or devices, and the like.

The device of the present application may include a memory 200, a processor 300 and a program stored in the memory 200, wherein the program is configured to be executed by the processor 300, and when the processor 300 executes the program, the steps of the above-mentioned robot visual inertial real-time positioning method are implemented.

The above-mentioned embodiments are only the preferred embodiments of the present application, which cannot be used to limit the scope of protection of the present application. Any immaterial changes and substitutions made by those skilled in the art on the basis of the present application fall into the scope of protection claimed by the present application.

The present disclosure may be a system, method and/or computer program product. The computer program product may include a computer-readable storage medium having computer-readable program instructions loaded thereon for causing a processor to implement various aspects of the present disclosure.

A computer-readable storage medium may be a tangible device that can hold and store instructions for use by the instruction execution device. The computer-readable storage medium may be, for example, but not limited to, an electrical storage device, a magnetic storage device, an optical storage device, an electromagnetic storage device, a semiconductor storage device, or any suitable combination of the foregoing. More specific examples (non-exhaustive list) of computer readable storage media include: portable computer disks, hard disks, random access memory (RAM), read only memory (ROM), erasable programmable read only memory (EPROM) or flash memory), static random access memory (SRAM), portable compact disk read only memory (CD-ROM), digital versatile disk (DVD), memory sticks, floppy disks, mechanically coded devices, such as printers with instructions stored thereon Hole cards or raised structures in grooves, and any suitable combination of the above. Computer-readable storage media, as used herein, are not to be construed as transient signals per se, such as radio waves or other freely propagating electromagnetic waves, electromagnetic waves propagating through waveguides or other transmission media (e.g., light pulses through fiber optic cables), or through electrical wires transmitted electrical signals.

Aspects of the present disclosure are described herein with reference to flowchart illustrations and/or block diagrams of methods according to embodiments of the disclosure. It will be understood that each block of the flowchart illustrations and/or block diagrams, and combinations of blocks in the flowchart illustrations and/or block diagrams, can be implemented by computer readable program instructions.

The computer readable program instructions described herein may be downloaded to various computing/processing devices from a computer readable storage medium, or to an external computer or external storage device over a network such as the Internet, a local area network, a wide area network, and/or a wireless network. The network may include copper transmission cables, fiber optic transmission, wireless transmission, routers, firewalls, switches, gateway computers, and/or edge servers. A network adapter card or network interface in each computing/processing device receives computer-readable program instructions from a network and forwards the computer-readable program instructions for storage in a computer-readable storage medium in each computing/processing device.

Computer program instructions for carrying out operations of the present disclosure may be assembly instructions, instruction set architecture (ISA) instructions, machine instructions, machine-dependent instructions, microcode, firmware instructions, state setting data, or instructions in one or more programming languages. Source or object code, written in any combination, including object-oriented programming languages, such as Smalltalk, C++, etc., and conventional procedural programming languages, such as the "C" language or similar programming languages. The computer readable program instructions may execute entirely on the user's computer, partly on the user's computer, as a stand-alone software package, partly on the user's computer and partly on a remote computer, or entirely on the remote computer or server implement. In the case of a remote computer, the remote computer may be connected to the user's computer through any kind of network, including a local area network (LAN) or a wide area network (WAN), or may be connected to an external computer (e.g., using an Internet service provider through the Internet connect). In some embodiments, custom electronic circuits, such as programmable logic circuits, field programmable gate arrays (FPGAs), or programmable logic arrays (PLAs), can be personalized by utilizing state information of computer readable program instructions. Computer readable program instructions are executed to implement various aspects of the present disclosure.

These computer readable program instructions may be provided to a processor of a general purpose computer, special purpose computer or other programmable data processing apparatus to produce a machine that causes the instructions when executed by the processor of the computer or other programmable data processing apparatus, resulting in means for implementing the functions/acts specified in one or more blocks of the flowchart and/or block diagrams. These computer readable program instructions can also be stored in a computer readable storage medium, these instructions cause a computer, programmable data processing apparatus and/or other equipment to operate in a specific manner, so that the computer readable medium on which the instructions are stored includes an article of manufacture comprising instructions for implementing various aspects of the functions/acts specified in one or more blocks of the flowchart and/or block diagrams.

Computer readable program instructions can also be loaded onto a computer, other programmable data processing apparatus, or other equipment to cause a series of operational steps to be performed on the computer, other programmable data processing apparatus, or other equipment to produce a computer-implemented process, thereby causing instructions executing on a computer, other programmable data processing apparatus, or other device to implement the functions/acts specified in one or more blocks of the flowcharts and/or block diagrams.

The flowcharts in the FIGURES illustrate the operation of possible implementations of methods according to embodiments of the present disclosure. In this regard, each block in the flowchart may represent a module, segment, or portion of instructions, which comprises one or more functions for implementing the specified logical function(s) executable instructions. In some alternative implementations, the functions noted in the blocks may occur out of the order noted in the figures. For example, two blocks in succession may, in fact, be executed substantially concurrently, or the blocks may sometimes be executed in the reverse order, depending upon the functionality involved. It is also noted that each block of the block diagrams and/or flowchart illustrations, and combinations of blocks in the block diagrams and/or flowchart illustrations, can be implemented in dedicated hardware-based systems that perform the specified functions or actions, or can be implemented in a combination of dedicated hardware and computer instructions.

Various embodiments of the present disclosure have been described above, and the foregoing descriptions are exemplary, not exhaustive, and not limiting of the disclosed embodiments. Numerous modifications and variations will be apparent to those of ordinary skill in the art without departing from the scope and spirit of the described embodiments. The terminology used herein was chosen to best explain the principles of the various embodiments, the practical application or improvement over the technology in the marketplace, or to enable others of ordinary skill in the art to understand the various embodiments disclosed herein.

What is claimed is:

1. A global optimal robot visual positioning method based on point-line features, applied in a visual positioning system, for improving positioning accuracy of the robot's self-positioning, comprising the following steps:
   (1) acquiring a priori three-dimensional map of a current scene, the priori three-dimensional map including measurement data of gravity acceleration and three-dimensional point-line features;
   (2) acquiring a current camera image of the robot and a measured gravity acceleration;
   (3) calculating a pitch angle and a roll angle of a current pose of the robot according to the matched two-dimensional to a measured gravity acceleration of the robot and the measurement data of gravity acceleration in the priori three-dimensional map; detecting two-dimensional point-line features of the current camera image of the robot, and matching the detected two-dimensional point-line features with the three-dimensional point-line features in the priori three-dimensional map;
   (4) constructing translation-independent metrics according to matched two-dimensional to three-dimensional point-line features, and decoupling a robot pose solving problem into two sub-problems of rotation and translation, the two sub-problems comprising solving a rotation unknown and then solving a translation unknown, wherein the rotation unknown is a yaw angle, the rotation unknown being solved by one-dimensional search enumeration completed by a branch-and-bound algorithm, and the translation unknown is solved by one-dimensional search voting on components in three directions of the translation unknown, respectively; obtaining an optimal solution of global pose estimation;

(5) utilizing the optimal solution of global pose estimation for self-positioning of the robot, wherein in step (3), the gravity acceleration $[x_c \ y_c \ z_c]^T$ measured in a coordinate system of the robot and the gravity acceleration $[x_w \ t_w \ z_w]^T$ measured in a coordinate system of the priori three-dimensional map are aligned to obtain the pitch angle $\beta$ and the roll angle $\gamma$ of the current coordinate system of the robot relative to the coordinate system of the priori three-dimensional map, the pitch angle $\beta$ and the roll angle $\gamma$ are specifically as follows:

$$\begin{bmatrix} 1 & 0 & 0 \\ 0 & \cos(\gamma) & -\sin(\gamma) \\ 0 & \sin(\gamma) & \cos(\gamma) \end{bmatrix} \begin{bmatrix} \cos(\beta) & 0 & \sin(\beta) \\ 0 & 1 & 0 \\ -\sin(\beta) & 0 & \cos(\beta) \end{bmatrix} \begin{bmatrix} x_c \\ y_c \\ z_c \end{bmatrix} = \begin{bmatrix} x_w \\ y_w \\ z_w \end{bmatrix};$$

in step (3), a distance between corresponding descriptors of the two-dimensional point-line features of the current image of the robot and the three-dimensional point-line features of the priori three-dimensional map in a metric space is calculated, and the features with the distance which is less than a preset threshold value are matched to obtain a plurality of pairs of matched features;

in step (4), a point $p_i$ in the three-dimensional map and a corresponding matched point $u_i$ in a two-dimensional image satisfy the following relationship:

$$u_i = \pi(Rp_i + t, K) + o_i + e_i$$

where R is a rotation matrix, $\pi$ is a camera projection equation of a camera internal reference K, $e_i$ is observation noise; a wrong match is an outer point, a correct match is an inner point, $o_i$ is zero for the inner point and is arbitrary for the outer point, and a problem of robot pose estimation is transformed into a problem of a maximizing consensus set:

$$\max_{R,t,\{z_i\}} \sum z_i$$

$$\text{s.t. } z_i |u_i - \pi(Rp_i + t, K)| \le n_i, i \in \mathcal{P}$$

where t is a translation vector; $z_i=0$ means $o_i$ is 0, $z_i=1$ means $o_i$ is not 0; $n_i > |e_i|$ is a bound of the observation noise; $\mathcal{P}$ is a set of three-dimensional to two-dimensional matched point features;

in step (4), a non-normalized vector $\tilde{u}_i$ is obtained from a center of the camera according to the point $u_i$ in the two-dimensional image:

$$\tilde{u}_i \triangleq \begin{pmatrix} \tilde{u}_{i,x} \\ \tilde{u}_{i,y} \\ 1 \end{pmatrix} = K^{-1} \begin{pmatrix} u_i \\ 1 \end{pmatrix}$$

the point $p_i$ in the three-dimensional map corresponding to the point $u_i$ in the two-dimensional image is transformed into a coordinate system of the camera:

$$\frac{R_1 p_i + t_x}{\tilde{u}_{i,x}} = \frac{R_2 p_i + t_y}{\tilde{u}_{i,y}} = R_3 p_i + t_z$$

Where $R \triangleq (R_1^T, R_2^T, R_3^T)^T$, $t \triangleq (t_x, t_y, t_z)^T$; two constraints are obtained from the above formula, and two constraints are further obtained similarly from another group of three-dimensional to two-dimensional matched features, and a translation amount t is eliminated by combining the above four constraints to obtain a translation-independent metric $d_p(\alpha)$ derived from feature matching points:

$$d_p(\alpha) = d_{p,1} \sin\alpha + d_{p,2} \cos\alpha + d_{p,3}$$

where $d_{p,1}$, $d_{p,2}$, $d_{p,3}$ are coefficients of $d_p(\alpha)$; $\alpha$ is the yaw angle; the robot pose estimation problem is transformed into the following maximizing consensus set problem:

$$\max_{R(\alpha),\{z_{ij}\}} \sum z_{ij}$$

$$\text{s.t. } z_{ij} |d_{p,ij}(\alpha)| \le n_{ij}, i, j \in \mathcal{B}$$

where $n_{ij} = \min(n_i, n_j)$; $z_{ij}=1$ means that feature matching points of an $i^{th}$ group and a $j^{th}$ group are all inner points, otherwise, $z_{ij}=0$;

in step (4), two ends $\tilde{u}_{k1}$ and $\tilde{u}_{k2}$ of a two-dimensional line segment and a point $p_k$ on a corresponding three-dimensional line segment satisfy the following relationship:

$$(\tilde{u}_{k1} \times \tilde{u}_{k2})^T (Rp_k + t) = 0$$

a constraint is obtained from the above formula, another point on the three-dimensional line segment is arbitrarily taken to obtain another constraint, and the translation amount t is eliminated by combining the above two constraints to obtain a translation-independent metric $d_l(\alpha)$ derived from line feature matching:

$$d_l(\alpha) = d_{l,1} \sin\alpha + d_{l,2} \cos\alpha + d_{l,3}$$

where $d_{l,1}$, $d_{l,2}$, $d_{l,3}$ are coefficients of $d_l(\alpha)$; the robot pose estimation problem is transformed into the following maximizing consensus set problem:

$$\max_{R(\alpha),\{z_*\}} \sum z_*$$

-continued s.t. $z_{ij}|d_{p,ij}(\alpha)| \le n_{ij}$, $i, j \in \mathcal{B}$ $z_k|d_{l,k}(\alpha)| \le n_k$, $k \in \mathcal{L}$ where $z_*$ is used to refer to $z_{ij}$ and $z_k$; wherein $z_k=1$ indicates that the feature matching corresponding to a $k^{th}$ line feature is an inner point, and $z_{ij}=1$ indicates that the feature matchings corresponding to $i^{th}$ and $j^{th}$ point features are inner points; $\mathcal{L}$ is a set of line features, and $n_k$ is a bound of the observation noise corresponding to the $k^{th}$ line feature.

2. The global optimal robot visual positioning method based on point-line feature according to claim 1, wherein in step (4), $d_p(\alpha)$ and $d_l(\alpha)$ are unified as a translation-independent metric $d(\alpha)$:

$$d(\alpha) = d_1\sin\alpha + d_2\cos\alpha + d_3$$

$$= \sqrt{d_1^2 + d_2^2}(\sin\alpha\cos a_2 + \cos\alpha\sin a_2) + d_3$$

$$= a_1\sin(\alpha + a_2) + d_3$$

$$a_1 = \sqrt{d_1^2 + d_2^2}, \sin a_2 = \frac{d_2}{d_1}, \cos a_2 = \frac{d_1}{a_1}$$

where $d_1$, $d_2$, $d_3$ are coefficients of $d(\alpha)$; a lower bound $\underline{d}(A)$ of the translation-independent metric of the yaw angle $\alpha$ is:

$$\underline{d}(A) = \min|a_1\sin(\alpha + a_2) + d_3|$$

where A is an interval subset including the yaw angle $\alpha$, $\alpha \in A$; the maximizing consensus set problem corresponding to $\underline{d}(A)$ is:

$$\max_{R(\alpha),\{z_*\},\alpha \in A}\sum z_*$$

s.t. $z_{ij}\underline{d}_{p,ij}(A) \le n_{ij}$, $i, j \in \mathcal{B}$ $z_k\underline{d}_{l,k}(A) \le n_k$, $k \in \mathcal{L}$ where $\underline{d}_{p,ij}(A)$ is a translation-independent metric derived from point features on A, and $\underline{d}_{l,k}(A)$ is a translation-independent metric derived from line features on A; a number of inner points in the consensus set corresponding to the yaw angle $\alpha$ is recorded as an energy function $E(\alpha)$, and an upper bound of $E(\alpha)$ is recorded as $\overline{E}(A)$:

$$E(\alpha) \le \overline{E}(A) = \sum \hat{z}_*, \alpha \in A$$

where $\hat{z}_*$ is a number of inner points of the optimal consensus set obtained by solving the maximizing consensus set problem;

a whole global optimal rotation solving comprises the following steps: initializing a range $[-\pi, \pi]$ of the yaw angle into a plurality of subsets A, the plurality of subsets A forming a sequence q, and initializing an optimal value of the energy function and an optimal value of the yaw angle; before q is empty, cyclically executing the following operations: taking out a first subset A of q to calculate $\overline{E}(A)$, wherein if $\overline{E}(A)$ is greater than a current optimal value of the energy function, $E(\alpha_c)$ is calculated according to a center $\alpha_c$ of the subset A, while if $E(\alpha_c)$ is also greater than the current optimal value of the energy function, the current optimal value of the energy function is updated as $E(\alpha_c)$, and the current optimal value of the yaw angle is $\alpha_c$; if $\overline{E}(A)$ is smaller than the current optimal value of the energy function, continuing to traverse remaining subsets A until q is empty, and returning to a final optimal value of the yaw angle.

3. The global optimal robot visual positioning method based on point-line feature according to claim 2, wherein in step (4), when the yaw angle is known, the maximizing consensus set problem regarding the translation amount is:

$$\max_{t,\{z_i\}}\sum z_i$$

s.t. $z_i|A_i t + b_i| \le n_i$, $i \in \mathcal{B} \cup \mathcal{L}$ where $A_i$ and $b_i$ are coefficients of a linear function regarding the translation amount corresponding to the known yaw angle;

according to a set of three-dimensional to two-dimensional matched features with at least one point feature, the maximizing consensus set problem regarding the translation amount is updated as follows:

$$\max_{t,\{z_{ij}\}}\sum z_{ij}$$

s.t. $z_{ij}|\hat{t}_{ij} - t| \le n_{ij}$, $i \in \mathcal{B}$, $j \in \mathcal{B} \cup \mathcal{L}$ where $\hat{t}_{ij}$ is an estimation of the translation amount; the translation amount is decoupled into three components in x, y and z directions, and the maximizing consensus set problem regarding the translation amount in x direction is as follows:

$$\max_{t_x,\{z_{ij}\}}\sum z_{ij}$$

s.t. $z_{ij}|\hat{t}_{ij,x} - t_x| \le n_{ij,x}$, $i \in \mathcal{B}$, $j \in \mathcal{B} \cup \mathcal{L}$ similar to the maximizing consensus set problem regarding the translation amount in x direction, the maximizing consensus set problem regarding the translation amount in y and z directions can be obtained; according to geometric constraints, all feature combinations are traversed to obtain all possible $\hat{t}_{ij}$ and corresponding upper bounds $\overline{t}_{ij}$ and lower bounds $\underline{t}_{ij}$ thereto; by voting for all $\hat{t}_{ij}$, a feature matching support set of consistent estimation results is obtained, and then a global optimal translation estimation is obtained;

a whole global optimal translation solving comprises the following steps: initializing the optimal value of the energy function as 0 according to all translation estimation results and corresponding upper and lower bounds thereto, wherein an optimal inner point set is empty; voting for a translated x component to obtain all voting results and a corresponding voting feature set $S_x$, and sorting the set in a descending order according to a size of the feature set; traversing each voting result in $S_x$ and feature set $S_x([i])$: ending if the size of the feature set $S_x([i])$ is less than the optimal value of the current energy function, and proceeding to the next step if the size of the feature set $S_x([i])$ is no less than the optimal value of the current energy function; voting for all elements in the feature set of $S_x([i])$ in a translation y component to obtain a set $S_y$; traversing each voting set and feature set $S_y([j])$ in $S_y$: ending if the size of the feature set $S_y([j])$ is less than the optimal value of the current energy function, and proceeding to the next step if the size of the feature set $S_y([j])$ is no less than the optimal value of the current energy function; voting for all elements in the feature set $S_y([j])$ in a translation z component to obtain a set $S_z$; if the size of the voting feature set corresponding to a result of a maximum voting number in $S_z$ is larger than the optimal value of the current energy function, updating a larger value to the optimal value of the current energy function, updating the corresponding feature set to a current optimal inner point set, and continuing to traverse; otherwise, continuing to traverse directly instead of updating.

4. The global optimal robot visual positioning method based on point-line features according to claim 1, wherein the two-dimensional point-line features comprise two-dimensional point features and two-dimensional line features; a method for detecting the two-dimensional point features comprises Oriented FAST and Rotated BRIEF (ORB), Scale-Invariant Feature Transform (SIFT), Local Binary Pattern (LBP) and Histogram of Oriented Gradient (HOG) feature point detection algorithms; and detecting the two-dimensional line features utilizes Line Band Descriptor (LBD), Edge Drawing line (Edline) and Hough line detections; the distance of the metric space is a Euclidean distance.

5. A device based on the global optimal robot visual positioning method based on point-line features according to claim 1, the device comprising at least one processor and a memory configured to store instructions executable by the at least one processor, wherein the instructions cause the at least one processor to:
  acquire a priori three-dimensional map of the current scene and measurement data of gravity acceleration;
  acquire a current camera image and the measured gravity acceleration of the robot;
  calculate a pitch angle and a roll angle of a pose of the robot according to the measured gravity acceleration of the robot and the measurement data of the gravity acceleration in the priori three-dimensional map;
  match two-dimensional point-line features detected in the current camera image of the robot with three-dimensional point-line features in the priori three-dimensional map to obtain a plurality of two-dimensional to three-dimensional point-line feature matching pairs; and
  separate rotation and translation of the pose of the robot to be solved according to the acquired point-line feature matching pairs, solve the rotation first and then solve the translation, thereby completing dimension reduction of a search space and obtaining an accurate estimation result.

\* \* \* \* \*